(12) United States Patent
Guinan et al.

(10) Patent No.: US 6,883,330 B2
(45) Date of Patent: Apr. 26, 2005

(54) VARIABLE GEOMETRY INLET DESIGN FOR SCRAM JET ENGINE

(75) Inventors: Daniel P. Guinan, Hobe Sound, FL (US); Alan Drake, Tequesta, FL (US); Dean Andreadis, Palm Beach Gardens, FL (US); Stephen A. Beckel, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 240 days.

(21) Appl. No.: 10/264,172

(22) Filed: Oct. 2, 2002

(65) Prior Publication Data

US 2004/0065087 A1 Apr. 8, 2004

(51) Int. Cl.[7] .................................................. F02K 7/08
(52) U.S. Cl. ......................................... 60/768; 60/767
(58) Field of Search ................................... 60/767, 768

(56) References Cited

U.S. PATENT DOCUMENTS

| 4,194,519 | A | * | 3/1980 | Baker et al. ............... 137/15.1 |
| 5,094,070 | A | * | 3/1992 | Enderle ....................... 60/224 |
| 5,094,071 | A | * | 3/1992 | Jabs ............................ 60/244 |
| 5,116,251 | A | * | 5/1992 | Bichler et al. ............ 244/53 B |
| 5,214,914 | A | * | 6/1993 | Billig et al. ................. 60/204 |
| 5,255,513 | A | * | 10/1993 | Kutschenreuter et al. ...... 60/204 |
| 5,586,735 | A | * | 12/1996 | Falempin et al. ......... 244/53 B |
| 5,941,064 | A | * | 8/1999 | Chevalier et al. ............. 60/768 |
| 6,164,061 | A | * | 12/2000 | Chevalier et al. ............. 60/267 |
| 6,672,068 | B1 | * | 1/2004 | Bouchez et al. .............. 60/768 |
| 6,715,293 | B1 | * | 4/2004 | Sillence et al. ............... 60/768 |
| 2003/0154720 | A1 | * | 8/2003 | Boehnlein et al. ............ 60/767 |

* cited by examiner

*Primary Examiner*—Charles G. Freay
*Assistant Examiner*—William H. Rodriguez
(74) *Attorney, Agent, or Firm*—Bachman & LaPointe, P.C.

(57) ABSTRACT

The present invention relates to an improved variable geometry inlet for a scram jet engine having at least one combustor module. The variable geometry inlet comprises each combustor module having two sidewalls. Each of the sidewalls has a central portion with a thickness and a tapered profile forward of the central portion. The tapered profile terminates in a sharp leading edge. The variable geometry inlet further comprises each module having a lower wall and a movable cowl flap positioned forward of the lower wall. The movable cowl flap has a leading edge and the leading edges of the sidewalls intersect the leading edge of the cowl flap.

20 Claims, 3 Drawing Sheets

VARIABLE GEOMETRY INLET DESIGN FOR SCRAM JET ENGINE

STATEMENT OF GOVERNMENT INTEREST

The U.S. Government has a paid-up license in this invention and the right in limited circumstances to require the patent owner to license others on reasonable terms as provided for by the terms of Contract No. NAS1-970320 and Subcontract No. G1051-0004 awarded by NASA.

BACKGROUND OF THE INVENTION

The present invention relates to a variable geometry inlet for a supersonic combustion ram (scram) jet engine with single or multiple modules used to provide thrust for a hypersonic vehicle.

A scram jet engine typically requires a variable geometry inlet for operability and performance. A common approach is to use cowl inlet flap(s), whose position can be adjusted during flight. Several approaches to the design of a variable geometry inlet have been presented in the literature. They include, but are not limited to, those that incorporate in-stream strut actuation as shown in FIG. 1, a sidewall housed strut actuation as shown in FIG. 2, and a geared hinge actuation as shown in FIG. 3.

In-stream strut actuation provides a structurally efficient solution by distributing actuation loads across the width of the flap, but introduces undesirable flow disturbances in the inlet, and requires complicated sealing where the struts penetrate the body panel. Sidewall housed strut actuation eliminates the in-stream struts and their associated flow disturbances, but also requires complicated sealing where the actuation penetrates the extended sidewall structure. Geared hinge actuation eliminates the flow blockage and sealing issues, but requires a larger diameter hinge to house the gears, and is mechanically more complex.

A simple approach is required which eliminates the flow blockage of the in-stream struts, and eliminates the need for complicated seals.

SUMMARY OF THE INVENTION

Accordingly, it is an object of the present invention to provide an improved variable geometry inlet for a scram jet engine.

It is a further object of the present invention to provide a variable geometry inlet as above which eliminates flow blockage and the need for complicated seals.

It is yet a further object of the present invention to provide a variable geometry inlet as above which is simple in construction.

The foregoing objects are attained by the variable geometry inlet of the present invention.

In accordance with the present invention, a variable geometry inlet for a scram jet engine having at least one combustor module is provided. The variable geometry inlet broadly comprises each combustor module having two sidewalls and each said sidewall having a central portion with a thickness and a tapered profile forward of the central portion which terminates in a sharp leading edge. The variable geometry inlet further comprises each module having a lower wall and a movable cowl flap positioned forward of the lower wall. The movable cowl flap has a leading edge and the leading edges of the sidewalls intersect the cowl flap leading edge.

Other details of the variable geometry inlet design for scram jet engine of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
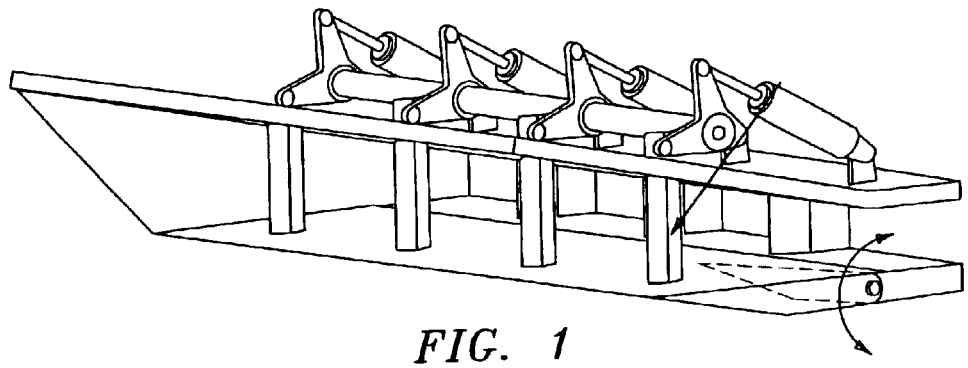
FIG. 1 illustrates a prior art variable geometry inlet which incorporates in-stream strut actuation.
Figure 2:
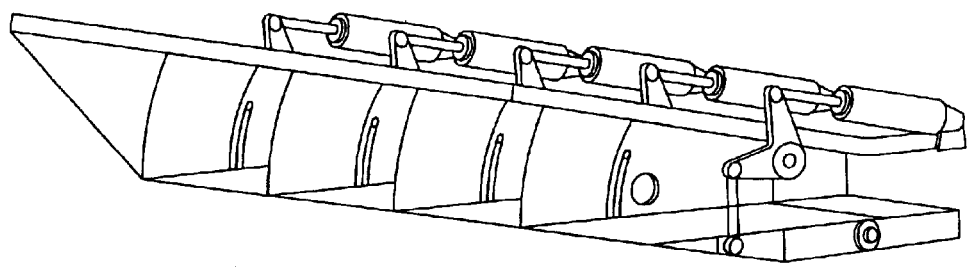
FIG. 2 illustrates a prior art variable geometry inlet which incorporates sidewall housed strut actuation.
Figure 3:
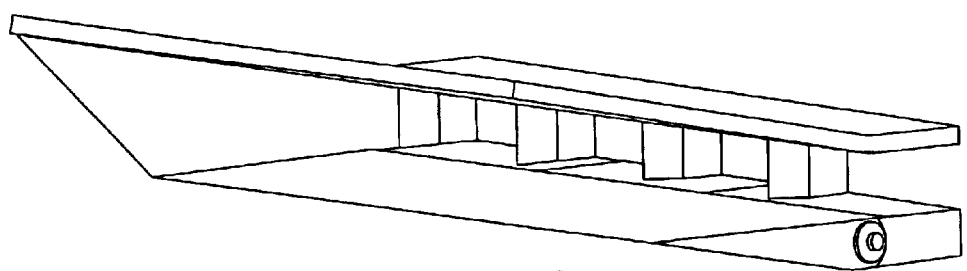
FIG. 3 illustrates a prior art variable geometry inlet which uses geared hinge actuation.
Figure 4:
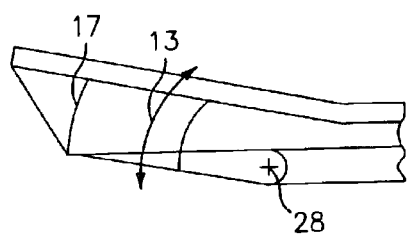
FIG. 4 illustrates a side view of a variable geometry inlet in accordance with the present invention.
Figure 5:
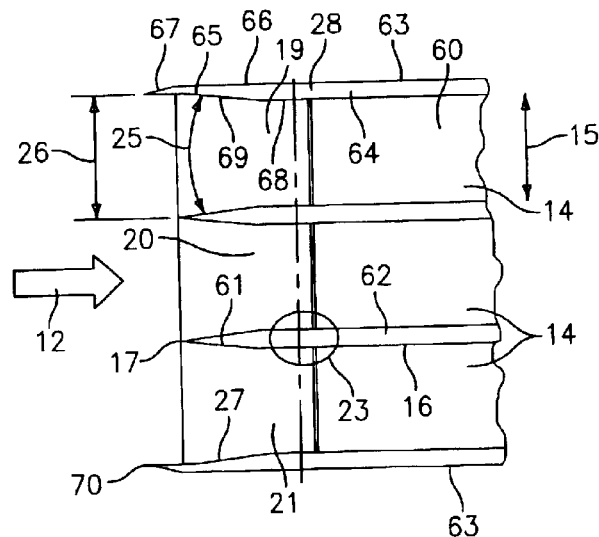
FIG. 5 is a sectional view of the variable geometry inlet of FIG. 4.
Figure 6:
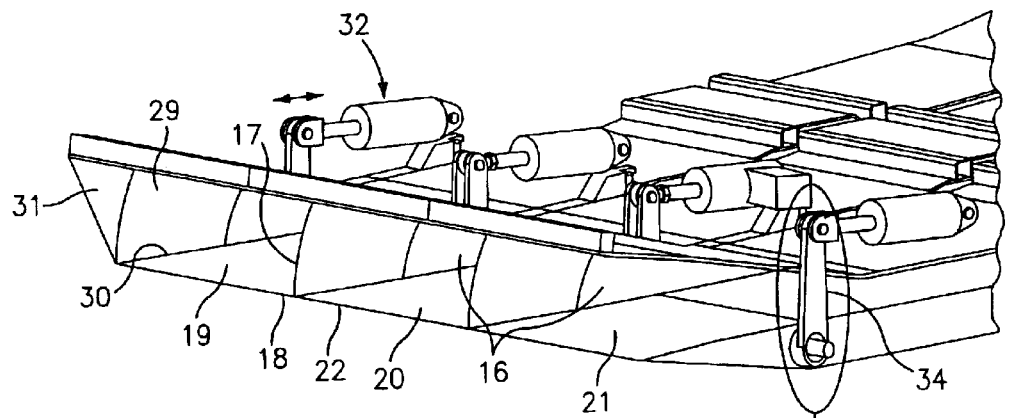
FIG. 6 is a perspective view of the variable geometry inlet of FIG. 4.

Referring now to the drawings, FIGS. 4 through 6 illustrate a variable geometry inlet 10 for a scram jet engine which is designed to provide equal and adjustable flow 12 and 13, respectively, to each combustor module 14 of the engine. As can be seen from FIG. 5, the modules 14 each have the same width 15 and a lower surface 60. Positioned in front of each of the lower surface portions 60 of a respective module 14 is a movable cowl flap 19, 20, or 21.

The sidewalls 16 between adjacent modules 14 have a central portion 61 with a desired thickness and a tapered profile 62 forward of the central portion. The tapered profile 62 terminates in a sharp leading edge 17. As can be seen in FIGS. 5 and 6, the edges 17 intersect at points 18 with the leading edges 22 of the respective cowl flaps 19, 20, and 21. Positioning the sidewall leading edges 17 in this way avoids potentially damaging "Type 4" shock interactions on the sidewall leading edges 17. It also provides structural volume 23 to house actuation components 24.

The variable geometry inlet also has two outboard sidewalls 63. Each outboard sidewall 63 has a central portion 64 with a thickness and a tapered profile 65 forward of the central portion 64. Each tapered profile 65 has an outer surface with a first wall portion 66 extending in a first plane and a second wall portion 67 tapered inwardly and an inner surface having a third wall portion 68 extending substantially parallel to the first wall portion 66 and a fourth wall portion 69 tapering outwardly. The second wall portion 67 and the fourth wall portion 69 meet to form a sharp leading edge 70. As can be seen from FIG. 5, the leading edge 70 of each outboard sidewall 63 extends forward of the leading edges 17 of the interior sidewalls 16 and the leading edges 22 of the cowl flaps 19, 20, and 21.

As can be seen in FIG. 5, each of the cowl flaps 19, 20, and 21 has side edges 71 which are flared from a trailing edge 72 to the leading edge 22 so as to follow or mimic the profile of the leading edges 17 or 70 of an adjacent one of the sidewalls 16 or 63. Each of the cowl flaps 19, 20, and 21 is widest at its leading edge 22. This configuration defines a module capture width 26. To maintain equal capture width 26 for each module 14, the outboard flaps 19 and 21 are identical to the inboard flap(s) 20 and the outboard sidewalls 63 mimic the internal sidewall profile 27.

The flaps 19, 20, and 21 rotate about a respective hinge line 28 between the sidewalls 16 and 63. As a result, the sidewall leading edges 17 and 70 form a body of revolution 29 about the hinge line 28 in order to maintain a constant gap 30 between a respective side edge 71 of a respective flap 19, 20 or 21 and an adjacent one of the sidewalls.

A swept extension 31 may be added to the outboard sidewall leading edges 70 to improve inlet performance by reducing local spillage.

Figure 7:
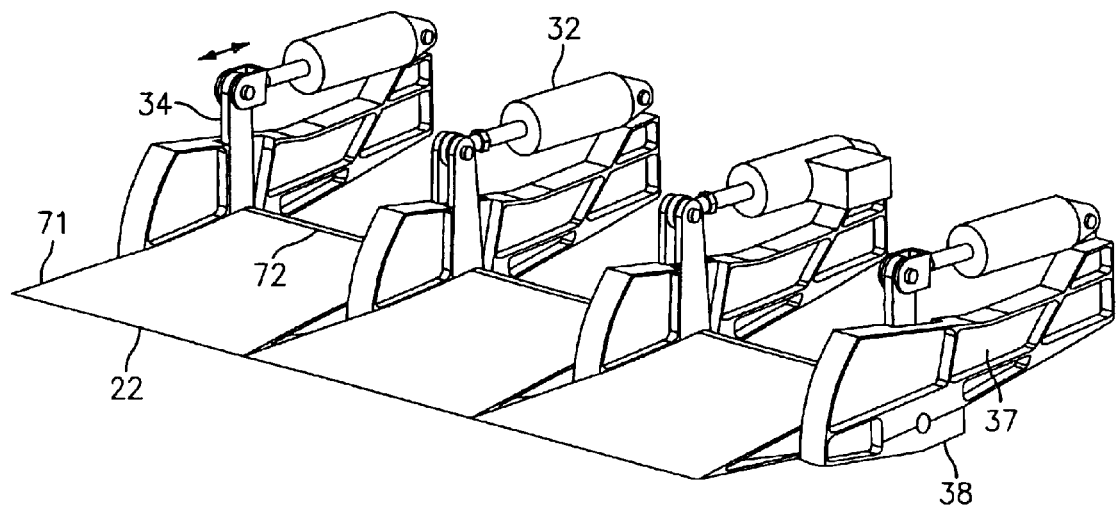
FIG. 7 is an isolated view of the cowl flap actuation system.
Figure 8:
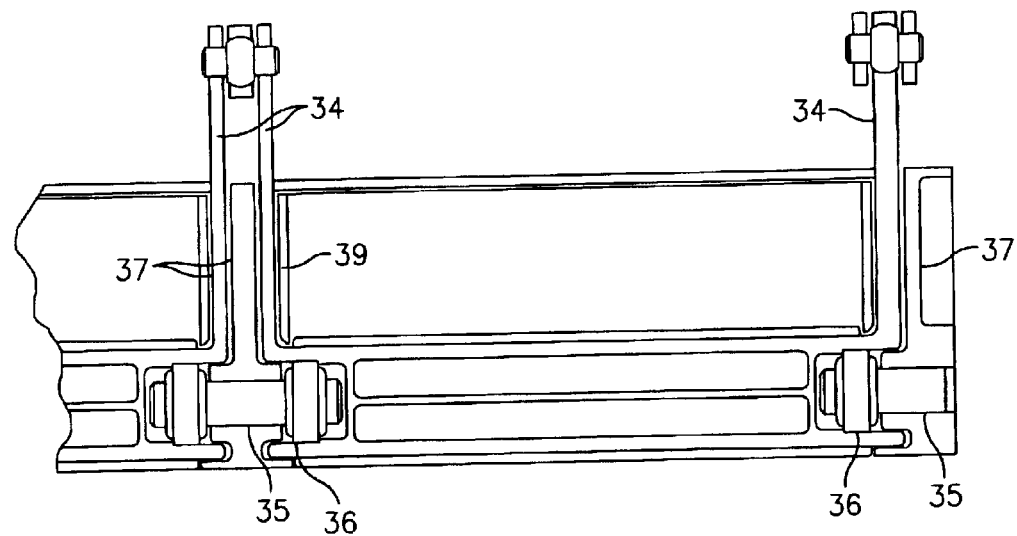
FIG. 8 is a sectional view taken through the cowl flap hinge line.

The flap system described above is driven by appropriately sized actuators 32 that push or pull crank arms 34 which are rigidly attached to the cowl flaps 19, 20, and 21. Referring now to FIGS. 7 and 8, it can be seen that the flaps 19, 20, and 21 are mechanically synchronized and pivot about hinge pins 35 and bearing arrangements 36 that are mechanically attached to the engine static structure 37 by one or more support blocks 38. The compact arrangement of these actuation components, as shown in FIGS. 7 and 8, is important to minimizing sidewall thickness 39 in the central portions 62 and 64, reducing drag, and making efficient use of engine width.

It is apparent that there has been provided in accordance with the present invention a variable geometry inlet design for a scram jet engine which fully satisfies the objects, means and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A variable geometry inlet for a scram jet engine having at least one combustor module, said inlet comprising:
    each said combustor module having two sidewalls;
    each said sidewall having a central portion with a thickness and a tapered profile forward of said central portion which terminates in a sharp leading edge;
    each said module having a lower wall and a movable cowl flap positioned forward of said lower wall; and
    said movable cowl flap having a leading edge.

2. A variable geometry inlet according to claim 1, further comprising:
    said leading edges of said sidewalls intersecting said cowl flap leading edge.

3. A variable geometry inlet according to claim 2, further comprising at least one of said sidewalls having a leading edge extending in front of the leading edge of said cowl flap.

4. A variable geometry inlet according to claim 2, further comprising means for actuating said cowl flap.

5. A variable geometry inlet according to claim 2, wherein each said sidewall central portion has a thickness sufficient to house at least one component for actuating said cowl flap.

6. A variable geometry inlet according to claim 2, wherein said cowl flap has a trailing edge and is flared from said trailing edge to said leading edge to follow said sidewall profile.

7. A variable geometry inlet for a scram jet engine having a plurality of combustor modules, said inlet comprising:
    a pair of outboard sidewalls and at least one interior sidewall defining said combustor modules; and
    each of said outboard sidewalls and each said interior sidewall having a central portion with a thickness and a tapered profile forward of said central portion which terminates in a sharp leading edge.

8. A variable geometry inlet according to claim 7, further comprising:
    each said module having a lower wall and a movable cowl flap positioned forward of said lower wall;
    each said cowl flap being positioned between two of said sidewalls and having a leading edge; and
    said leading edges of said two sidewalls each intersecting said cowl flap leading edge.

9. A variable geometry inlet according to claim 8, further comprising:
    each of said outboard sidewalls having a leading edge located forward of the leading edge of each said movable cowl flap.

10. A variable geometry inlet according to claim 8, wherein each said cowl flap has a trailing edge and flared edges extending from said trailing edge to said leading edge; and
    each said flared edges mimicking the tapered profile of an adjacent one of said sidewalls.

11. A variable geometry inlet according to claim 10, further comprising a constant gap between each said flared edge and said adjacent one of said sidewalls.

12. A variable geometry inlet according to claim 7, wherein each said module has a common width and an equal adjustable flow.

13. A variable geometry inlet according to claim 7, wherein each said module has an equal capture width.

14. A variable geometry inlet according to claim 8, wherein said cowl flaps rotate about a common hinge line.

15. A variable geometry inlet according to claim 14, further comprising means for actuating each of said cowl flaps.

16. A variable geometry inlet according to claim 15, wherein said actuation means includes a crank arm attached to each of said flaps and a plurality of actuators for operating each said crank arm.

17. A variable geometry inlet according to claim 16, wherein said actuation means further includes a plurality of hinge pins, bearings, and means for mechanically attaching said hinge pins and bearings to a static structure.

18. A variable geometry inlet according to claim 17, wherein said mechanical attaching means comprises at least one support block.

19. A variable geometry inlet according to claim 7, further comprising a swept extension added to each said outboard sidewall leading edge to reduce local spillage.

20. A variable geometry inlet for a scram jet engine having a plurality of combustor modules, said inlet comprising:
    a pair of outboard sidewalls and at least one interior sidewall defining said combustor modules;
    each of said outboard sidewalls and each said interior sidewall having a central portion with a thickness and a tapered profile forward of said central portion which terminates in a sharp leading edge; and
    said tapered profile for each said outboard sidewall including an outer surface having a first wall portion extending in a first plane and a second wall portion tapered inwardly and an inner surface having a third wall portion extending substantially parallel to said first wall portion and a fourth wall portion tapering outwardly.

* * * * *